United States Patent [19]
Mikami et al.

[11] 3,770,369
[45] Nov. 6, 1973

[54] METHOD OF BURNING LIQUID FUEL IN FLUID BED APPARATUS
[75] Inventors: Bunji Mikami, Tokyo; Mitsuaki Kawamura, Chiba, both of Japan
[73] Assignee: Mitsui Shipbuilding and Engineering Co. Ltd., Tokyo, Japan
[22] Filed: Mar. 22, 1972
[21] Appl. No.: 237,051

[30] Foreign Application Priority Data
Mar. 31, 1971 Japan.......................... 46/19970

[52] U.S. Cl........................... 432/15, 34/10, 431/10
[51] Int. Cl............................................. F21b 15/10
[58] Field of Search........................... 431/10, 239; 263/21 A; 34/10, 57 R, 57 A, 57 D, 57 E; 23/288 S; 432/15, 58

[56] References Cited
UNITED STATES PATENTS
3,539,293  11/1970  Boucraut et al............. 263/21 A X
3,417,978  12/1968  Suzukawa et al................ 263/21 A
2,666,269   1/1954  Parry........................... 263/21 A X

*Primary Examiner*—William F. O'Dea
*Assistant Examiner*—William C. Anderson
*Attorney*—Dexter N. Shaw et al.

[57]  ABSTRACT

A method of burning liquid fuel in a heat transfer furnace to raise the temperature of particulate material in a fluidized bed. The liquid fuel is burned outside of the furnace with insufficient air to effect complete combustion, but sufficient air to gasify the liquid fuel. The gasified fuel is introduced into the furnace on one side of the bed and the air for complete combustion is introduced from the other side of the bed, the flow through the bed being used to fluidize the particulate material therein. Preferably the air discharged from the furnace is used to preheat the air both for partially burning the liquid fuel to gasify it and for completing combustion of the gasified fuel, the latter air being introduced under the bed to fluidize the same and the gasified fuel being introduced into the furnace from above the bed.

2 Claims, 1 Drawing Figure

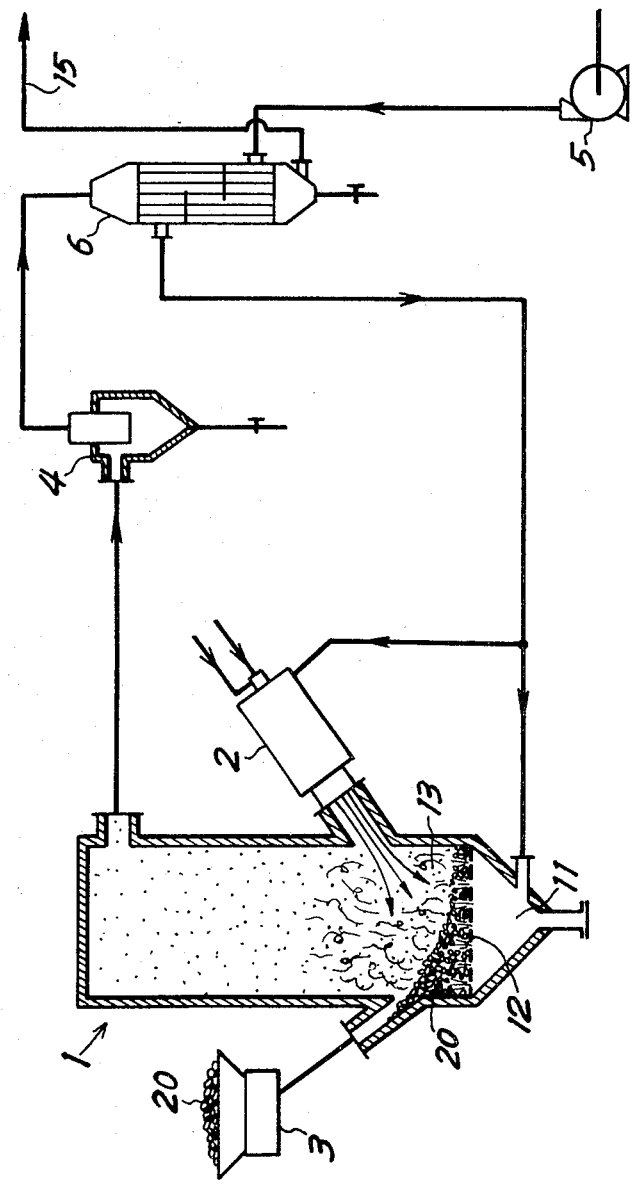

METHOD OF BURNING LIQUID FUEL IN FLUID BED APPARATUS

The present invention relates to a method of burning liquid fuel in fluid apparatus for decomposing endothermic reaction material such as sulfates or heating inactive materials such as sand.

There are two conventional methods: (1) A method for decomposing iron sulfate by simultaneously burning solid fuel such as pulverized coal, iron sulfide, etc.; (2) a method for decomposing waste sulfuric acid containing salt by spraying fuel oil directly into the fluidized bed. In the former method, there remain, in the resulting metal oxide product such impurities as ash and vein stone of iron sulfide, or iron oxide in case metal salt to be treated is other than iron sulfate. It is difficult to separate such impurities from the metal oxide product. In the latter method in which fuel oil is sprayed directly into the fluid bed, if low grade oil (e.g. ASTMD No.6) is used, inactive material sticks together by oil which results in decrease of fluidity of the bed, thereby making continuous operation of the apparatus impossible. In addition, product of good quality is not obtained, since unburned material is yielded in a large amount and causes to color the product acid in the case that sulfur dioxide is recovered in the form of sulfuric acid.

The present invention has for its object to provided a novel method which can use low grade oil for fuel in the fluid bed apparatus.

The present invention is characterized by that liquid fuel is partly burned by a special burner outside the fluid bed reactor so as to be gasified and the gasified fuel is injected into the bed of the material to be treated, so that decomposition of endothermic reaction material such as sulfate salts or heating of inactive material may be accomplished with liquid fuel particularly with low grade heavy oil.

The present invention will be better understood from the following description with reference to the drawing, which shows a schematic illustration of one embodiment of the present invention.

The FIGURE illustrates apparatus for performing a method of the present invention.

In the drawing, the reference numeral 1 denotes a furnace lined with firebrick the lower portion of which is provided with a windbox 11 and supporting plate 12. The numeral 2 indicates a special burner for gasifying heavy oil, the gas outlet of which is opened in the furnace wall near the fluidized bed 13. A hopper 3 of ore communicates with the fluidized bed portion. The numeral 4 indicates a cyclone separator for separating fine particles in the gas from the top of the furnace. The numeral 6 indicates a heat exchanger which cools the gas separated by the cyclone separator 4 with air supplied by a blower 5 and thereby heated air is fed to the burner 2 and the windbox 11 of furnace 1.

Material 20 to be treated is charged in the fluidized bed 13 from the hopper 3. A part of air enough to burn completely the supplied liquid fuel is fed from the heat exchanger to the burner 2, where the liquid fuel is partly burned by the air and gasified in the burner 2. The rest of the air is introduced from the windbox 11 through an supporting plate 12 to the fluidized bed 13. Thus the gasified fuel from the burner 2 is completely burned by the air and the the material 20 is heated to decomposition or to temperature rise uniformly by this combustion heat. The treated material floated and heated in the furnace 1 is sent together with gas to the cyclone separator 4, and the gas separated therein is then sent through the heat exchanger 6 and a gas recovering portion (not shown in the FIGURE) through a conduit 15. Air supplied by the blower 5 to the heat exchanger 6 gains heat and is sent to said burner 2 and the windbox 11. This air is preheated by heat exchange with combustion gas for saving fuel, or in some cases preheated by steam, etc. As the temperature of this gas can be kept at 900° to 1,000° C when air for partial combustion is not preheated, gasified fuel can be supplied to the furnace through the supporting plate 12 from the windbox 11, and in this case the rest of air completely burning the gas may be introduced into the fluidized bed without passing through the supporting plate.

Some of the excellent functional effects of the present invention may be pointed out as follows.

1. Low grade heavy oil may be used because the oil is gasified outside the furnace.
2. Since the gasified fuel is completely burned, the product acid is not colored in case that sulfur dioxide is recovered in the form of sulfuric acid.

EXAMPLE

The mixture of magnesium sulfate and manganese sulfate dried by a spray dryer to one molecule crystallization water was decomposed in an apparatus shown in the drawing (inside diameter of the brick of 500 mm).

Composition of treated material (dry-basis and percent by weight)

| | |
|---|---|
| Mg | 18.5 |
| Mn | 5.5 |
| S | 17.0 |
| Others | 59.0 (including oxygen, metals such as zinc, iron, lead, silicon, and impurities) |

Note: As chemical compound, most of it is $MgSO_4$ and $MnSO_4$; as impurity, about 25 percent by weight Particle size distribution

| | |
|---|---|
| Under 0.15 mm | 12.3 % |
| 0.15 to 0.59 mm | 2.5 |
| 0.59 to 1.99 mm | 85.2 |

Charging amount : 150 kg/hour (dry-basis)
Air preheating temperature: 300° C
Temperature inside the furnace: 950° C
Heavy oil consumption: 17.8 kg/hour (ASTMD No.6)
Air volume: 210 $NM^3$/hour
(of which 95.5 $NM^3$/hour was consumed for gasification)

The sulfur dioxide concentration in the waste gas corresponds to the sulfur content in the treated material and used heavy oil, and in this example sulfur dioxide accounts for 7.65 percent and oxygen 5.6 percent.

It is noted that this example has for its purpose to recover the treated material and the oxide of said treated material is accordingly used for the inactive fluidized bed but foundry sand and the like may be used when recovering gas alone.

What is claimed is:

1. A method of treating particulate material in a fluidized bed furnace by heat from burning liquid fuel comprising the steps of only partially burning the liquid fuel outside of the furnace by supplying oxygen thereto in an amount insufficient to effect complete combustion of the liquid fuel but an amount sufficient to gasify the liquid fuel, introducing a flow of the gasified liquid fuel into the furnace at one side of the fluidized bed of particulate material, supplying a flow of combustion air into the furnace from the opposite side of the fluidized bed of particulate material, the flows uniting within the furnace adjacent the bed and effecting complete burning of the gasified fuel, the flow through said fluidized bed effecting fluidization of the particulate material therein.

2. A method according to claim 1 wherein said gasified fuel is introduced into the furnace above the said fluidized bed and said combustion air is introduced into the furnace below said fluidized bed whereby the combustion air flows upwardly through the bed and fluidizes the particulate material therein.

* * * * *